UNITED STATES PATENT OFFICE.

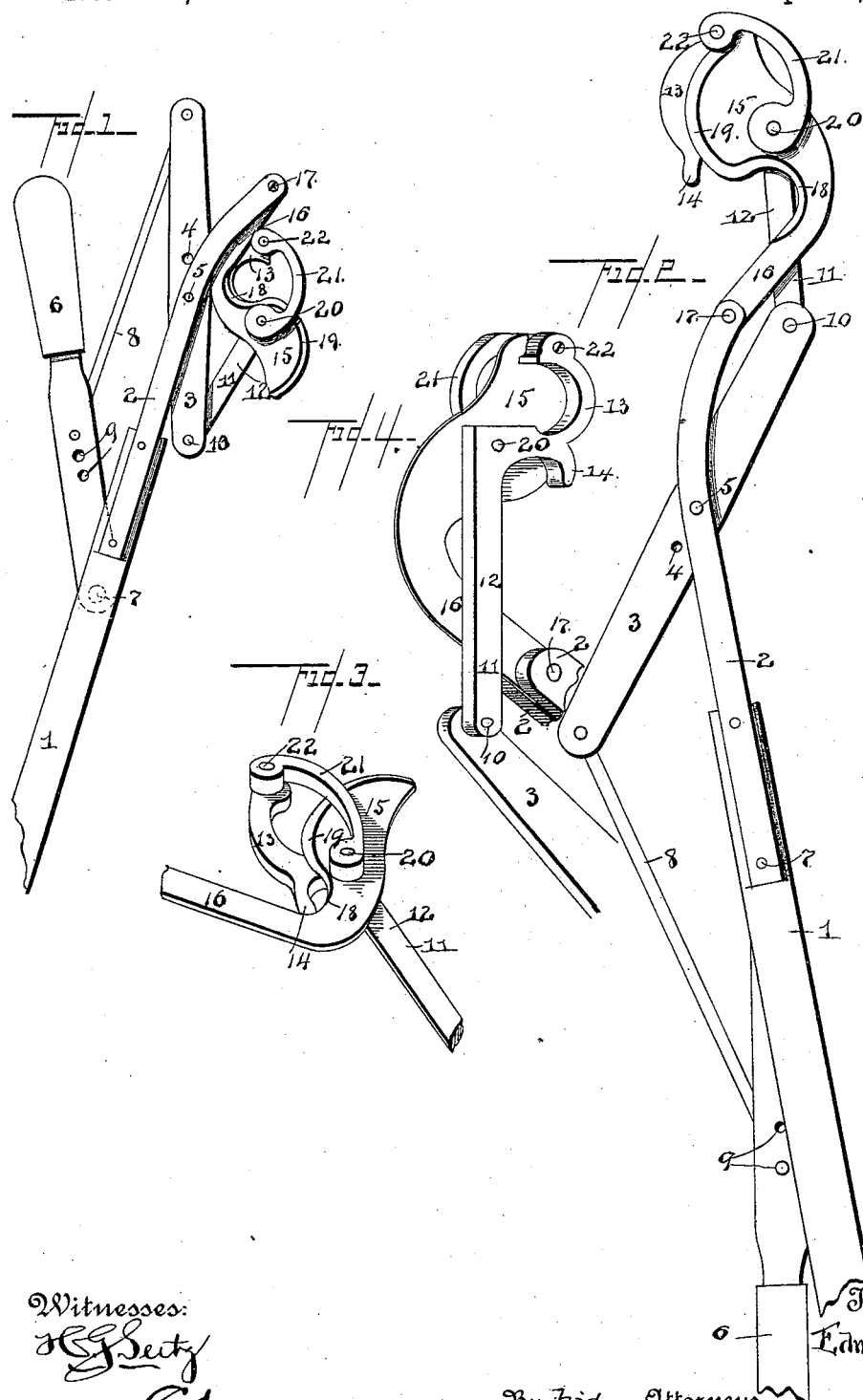

EDWIN B. STAUBER, OF STODDARD, NEBRASKA.

COMBINED CATTLE-DEHORNER AND PLANT-PRUNER.

SPECIFICATION forming part of Letters Patent No. 472,146, dated April 5, 1892.

Application filed May 7, 1891. Serial No. 391,950. (No model.)

*To all whom it may concern:*

Be it known that I, EDWIN B. STAUBER, a citizen of the United States, residing at Stoddard, in the county of Thayer and State of Nebraska, have invented a new and useful Combined Cattle-Dehorner and Plant-Pruner, of which the following is a specification.

This invention relates to a combined cattle-dehorner and pruning device; and the objects are to provide a cheap, durable, and efficient instrument adapted to be used for severing the horns of cattle in a clean manner and without straining the bones of the head of the animal and to be readily converted into an efficient and rapidly-operating pruning device.

With the above objects in view the invention consists in certain features of construction hereinafter specified, and particularly pointed out in the claim.

Referring to the drawings, Figure 1 is a side elevation of my implement, the same being open as in the act of receiving the horn or limb of a tree. Fig. 2 is a similar view, the device closed. Fig. 3 is an enlarged detail in perspective of the hook, removable guard, and knife. Fig. 4 is a similar view to Fig. 3, the device being shown closed.

Like numerals of reference indicate like parts in all the figures of the drawings.

In practicing my invention I employ a handle 1 of any suitable length, and to diametrically-opposite sides of the same, at its upper end, bolt a pair of straps, which near their ends are deflected in the same direction and out of line with the handle.

3 designates a lever, having a series of perforations 4, through either one of which may be passed a pivot-bolt 5, which is also inserted through the straps 2 just below their bends. A hand-lever 6 is pivoted by a bolt 7 to the under side of the handle 1, and the pitman-rod 8 connects one end of the lever 3 with said hand-lever 6 by engaging with any one of a series of perforations 9. It will be obvious that by operating the hand-lever 6 upon its fulcrum the lever 3 will be oscillated upon its pivot 5. Pivoted, as at 10, to the free end of the lever 3 is a hook-shaped arm 11, the shank 12 of which is straight and pivoted, as before mentioned, while its outer free end is curved to form the hook 13, provided at its rear side and tending toward the shank 11, with a smaller hook or finger 14.

15 designates a knife, and the same consists of a shank 16, pivoted, as at 17, between the outer ends of the straps 2, then compoundly curved to form the cutting-edges 18 and 19, adapted to co-operate with the hooks 14 and 13, respectively. The knife is pivoted to the shank 12, as indicated at 20, the pivot-bolt passing through the knife and also through a removable curved guard 21, the opposite end of which is bolted, as at 22, to the outer end of the hook 13. The length of the blades 18 and 19 are about double the length of the hooks 14 and 13, against which they operate, so that an object placed between the hook 13 and knife 19 or the hook 14 and knife 18 is cut or severed in a shear-like manner.

The manner of operating will be obvious from the foregoing description, but may be stated as follows: The horn of the animal is introduced between the hook 13 and the knife, the knife and hook having been previously separated by the swinging of the hand-lever from the handle. After fixing the instrument well down upon the base of the horn the hand-lever and handle are brought together, and the relative length of the knife and hook, together with the fact that the knife is pivoted eccentric with relation to the hook, causes said horn to be severed in a shear-like manner, the hook acting as a brace to the horn and preventing any chipping or cracking.

To use the instrument as a pruning device the guard 21 is removed, so as to form an open passage-way to the hook. The device is now passed up into a tree or inserted into a bush, and it will be obvious that the pruner may be operated from both sides—that is, dead twigs and branches may be severed first by the knife and hook 13 and upon the opposite side by the knife and hook 14 and 18. In this manner the necessity of turning the instrument every time a twig is to be engaged is obviated and the operation of pruning thereby greatly facilitated. By reason of the knife being formed upon a compound curve and the edge continuous the device may cut twigs both by the opening and closing of the shanks, so that the operation is further facilitated.

Having described my invention, what I claim is—

In an implement of the class described, the combination, with the shank 12, terminating at its outer end in a hook 13 and having at its rear side the hook 14, of the shank 16, terminating in the compoundly-curved knife pivoted to the shank 12, the guard 21, connected to the pivot of the knife and to the outer end of the hook, the handle 1, the straps 2, bolted to the handle and at their outer ends embracing and pivoted, as at 17, to the shank 16 of the knife, the perforated lever 3, pivoted, as at 5, between the straps and at one end, as at 10, to the shank 12, the handle-lever 6, pivoted, as at 7, to the handle 1, and the pitman or connecting-rod 8, connecting the handle-lever 6 with the free end of the lever 3, substantially as specified.

In testimony that I claim the foregoing as my own I have hereto affixed my signature in presence of two witnesses.

EDWIN B. STAUBER.

Witnesses:
SALLIE DINSMORE,
C. S. BURTON.